Oct. 16, 1951
O. B. BRAY
2,571,675
ADJUSTABLE THUMB AND FINGER LOOP FOR SCISSORS AND SHEARS
Filed Aug. 14, 1950
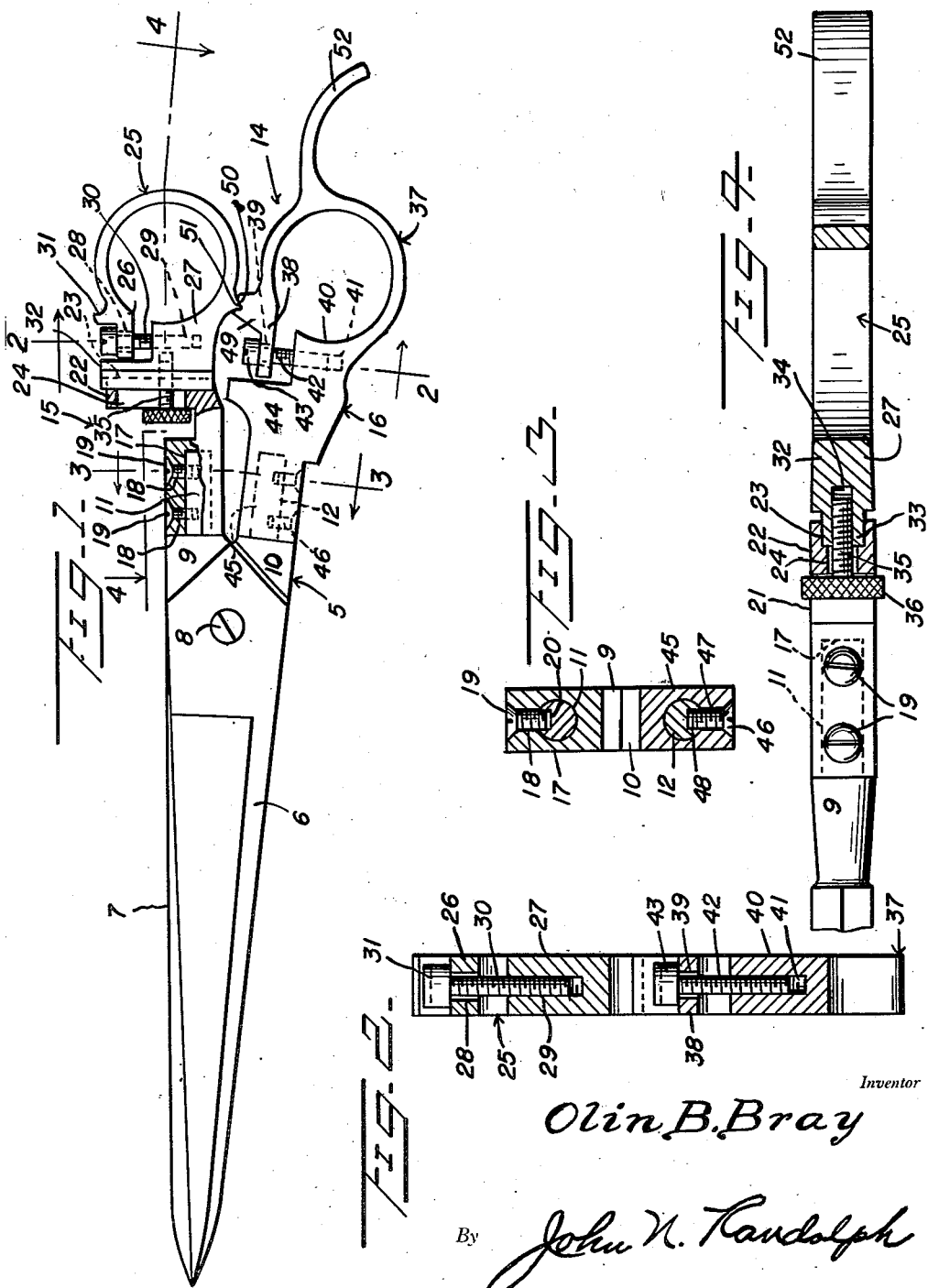
Inventor
Olin B. Bray
By John N. Randolph
Attorney Patented Oct. 16, 1951

2,571,675

UNITED STATES PATENT OFFICE 2,571,675

ADJUSTABLE THUMB AND FINGER LOOP FOR SCISSORS AND SHEARS

Olin B. Bray, Lynwood, Calif.

Application August 14, 1950, Serial No. 179,253

1 Claim. (Cl. 30—341)

This invention relates to a novel construction of scissors or shears having adjustable thumb and finger loops capable of being adjusted as to size for fitting thumbs and fingers of different sizes and so that the loops may be adjusted to snugly engage the thumb and middle finger so that the shears or scissors may be most comfortably held and conveniently and efficiently operated.

Still another object of the invention is to provide thumb and finger loops having means for adjusting one relative to the other to vary the extent of closing of the scissors or shear blades to compensate for wear on the cutting edges of the blades and so that the tip portions of worn blades may be moved into overlapping relationship to enable the cutting edges of worn blades to cut adjacent the tips of the blades.

A further object of the invention is to provide adjustable thumb and finger loops capable of being detachably mounted on a pair of blade shanks whereby the pair of blades after becoming worn or broken may be replaced with a new pair of blades without requiring a complete replacement of the scissors or shears.

Various other objects and advantages of the invention will hereinafter become more fully apparent from the following description of the drawing, illustrating a presently preferred embodiment thereof, and wherein:

Figure 1 is a plan view, partly in section, showing a pair of scissors or shears provided with the invention;

Figures 2 and 3 are enlarged cross sectional views taken substantially along planes as indicated by the lines 2—2 and 3—3, respectively, of Figure 1, and Figure 4 is an enlarged longitudinal sectional view, partly in edge elevation, taken substantially along a plane as indicated by the line 4—4 of Figure 1.

Referring more specifically to the drawing, a pair of scissors or shears, designated generally 5, is illustrated comprising a pair of conventional scissors or shear blades 6 and 7 which are disposed, as is conventional, in partially overlapping relationship when the blades are in closed position. The blades 6 and 7 are pivotally connected in crossed relationship by a pivot element 8 such as a screw which is spaced inwardly from the cutting portions of the blades 6 and 7 and said blades 6 and 7, on the opposite side of the pivot 8 are provided with lever portions 9 and 10, respectively, which, in the embodiment of the invention as disclosed, are each provided with a restricted shank portion as seen at 11 and 12, respectively, which form the free ends of the levers 9 and 10. The parts 6 to 12, inclusive, are conventional in certain types of scissors and shears and the adjustable unit, designated generally 14 including the thumb and finger loops constitutes the present invention.

The unit 14 includes the sections, designated generally 15 and 16. The section 15 includes an elongated socket 17 for accommodating one of the lever shanks, such as the shank 11 and the open end of which socket 17 abuts against the lever end 9 from which the shank 11 projects. The socket 17 is provided with transverse threaded bores 18 which open into the socket cavity to receive setscrews 19 which are countersunk in said socket and which extends into transverse recesses 20 of the shank 11 for detachably and nonrotatably securing the socket 17 on the lever shank 11. The opposite, closed end of the socket 17 is provided with an extension 21 having an arm 22 which projects at an angle therefrom and which is disposed preferably at substantially a right angle to the axis of the socket 17. The arm 22 is provided on its outer side with a groove or channel 23, as best seen in Figure 4 and has a longitudinally extending slot 24 which opens into the channel 23. The section 15 includes an adjustable thumb loop 25 having split ends 26 and 27. The loop end 26 is provided with an opening 28 which aligns with a threaded socket 29, of a smaller diameter, in the loop end 27. An adjusting screw 30 extends loosely through the opening 28 and threadedly engages in the threaded socket 29 and has a head 31 which bears against an outer surface and the loop end 26 for displacing said loop end toward the loop end 27, to restrict the size of the loop 25, when the screw 30 is advanced into the socket 29. As best illustrated in Figure 4, the loop end 27 is provided with an integral bar 32 which is spaced outwardly from the loop 25 and which extends across the outer end of the loop end 26. The bar 32 is provided with a restricted outer portion 33 which is sized to slidably engage in the channel 23. The bar 32 is provided with a threaded recess 34 which opens outwardly of its restricted portion 33 and which threadedly receives the threaded shank of a screw 35 which extends loosely through the slot 24 and which has an enlarged, knurled head 36 which bears against the other, inner side of the arm 22. Accordingly, it will be apparent that the screw 35 may be loosened so that the bar portion 33 may slide longitudinally in the channel 23 and the screw 36 thereafter tightened for clamping the bar portion 33 against the bed of the channel 23 to secure said bar portion in a plurality of adjusted positions relatively to the arm 22.

The section 16 includes a split finger engaging loop 37 having an end 38, complementary to the loop end 26 and which is provided with a relatively large opening 39. The other loop end 40 is provided with a threaded socket 41 of smaller diameter than the opening 39 and which aligns therewith to receive a headed screw 42, corresponding to the screw 30, which threadedly engages the socket 41 and extends loosely through the opening 39 and has a head 43 which bears against the outer side of the loop end 38. The loop end 40 is provided with an integral extension 44 which extends away from the loop 37 and the free end portion of which is provided with a longitudinally extending outwardly opening socket 45, corresponding to the socket 17, for receiving the lever shank 12 which is secured therein in the same manner as previously described with reference to the lever shank 11 and socket 17 by countersunk screws 46 which engage transverse threaded bores 47 of the socket 45 and extend into radial recesses 48 of the shank 12 for detachably and non-rotatably securing the section 16 to the lever shank 12.

The loop end 38 is preferably provided with an external projection 49 having an outwardly opening notch 50 to receive a tapered projection 51 of the loop 25 when the blades 6 and 7 are in closed positions and which form stops for limiting movement of the loops 25 and 37 toward one another and for limiting the closing movement of the shear blades 6 and 7. The loop 37 may likewise be provided with an extension forming a finger rest 52.

From the foregoing it will be readily apparent that the screws 30 and 42 may be tightened or loosened to restrict or enlarge, respectively, the thumb loop 25 and finger loop 37 for accommodating thumbs and fingers of different sizes and so that the thumb and finger may be snugly engaged in said loops to comfortably support the scissors or shears 5 thereon and so that the scissors or shears may be most conveniently and efficiently operated. The loops 25 and 37 tend to swing open or enlarge and are drawn together by the screws 30 and 42. Likewise, by loosening the screw 35, the loop 25 may be displaced toward or away from the loop 37 and secured in any adjusted position by thereafter tightening the screw 35, as previously described, to vary the extent that the blades 6 and 7 may move before reaching fully closed positions so that after the cutting edge of the blades have been worn down the blades may be allowed to close to a greater extent so that the outer portions of the cutting edges will overlap when in fully closed positions.

Obviously, if desired, the socket portions 17 and 45 may form integral extensions of the blade levers 9 and 10 rather than being detachably mounted thereon as illustrated, and various other modifications and changes are contemplated and may likewise be resorted to, without departing from the spirit of scope of the invention as hereinafter defined by the appended claim.

I claim as my invention:

In a pair of shears, a thumb receiving loop and a finger receiving loop forming extremities of a pair of shear blade levers, each of said loops being split and the split ends of each loop being spring urged away from one another by the inherent resiliency of the loops, fastening means connecting the split ends of each loop and adjustable for drawing said split ends toward one another to restrict the openings defined by the loops to fit thumbs and fingers of different sizes, said loops having portions disposed in abutting engagement when the shears are in a fully closed position, means slidably mounting one of said loops for movement toward and away from the other loop and relative to the blade lever of which said loop forms a part for varying the extent of movement of the blade levers toward a closed position to compensate for displacement of said abutting portions of the loops toward and away from one another when the size of the loops are varied by adjustment of the fastening means.

OLIN B. BRAY.

REFERENCES CITED

The following references are of record in the file of this patent:

UNITED STATES PATENTS

| Number | Name | Date |
| --- | --- | --- |
| Re. 638 | Braden | Dec. 28, 1858 |
| 280,047 | Kully | June 26, 1883 |
| 848,966 | Carlson | Apr. 2, 1907 |
| 927,058 | Krouse | July 6, 1909 |